US005333304A

United States Patent [19]

Christensen et al.

[11] Patent Number: 5,333,304

[45] Date of Patent: Jul. 26, 1994

[54] METHOD AND APPARATUS FOR SOFTWARE APPLICATION EVALUATION UTILIZING COMPILER APPLICATIONS

[75] Inventors: James E. Christensen, Peekskill, N.Y.; Kenneth W. Christopher, Jr., Lighthouse Point, Fla.; Marc L. Cohen; Paul G. Giangarra, both of Boca Raton, Fla.

[73] Assignee: International Business Machines Corporation, Armonk, N.Y.

[21] Appl. No.: 695,375

[22] Filed: May 3, 1991

[51] Int. Cl.[5] .............................................. G06F 11/00

[52] U.S. Cl. ........................................ 395/575; 371/19

[58] Field of Search .................. 395/575; 371/19, 15.1

[56] References Cited

U.S. PATENT DOCUMENTS 3,702,005 10/1972 Ingalls, Jr. .
4,617,663 10/1986 Lake et al. ............................ 371/25
4,802,165 1/1989 Ream .
4,819,233 4/1989 Delucia et al. .
4,853,851 8/1989 Horsch .
4,866.665 9/1989 Haswell-Smith ..................... 371/19
4,920,538 4/1990 Chan et al. .
4,937,740 6/1990 Agarwal et al. .
5,065,400 12/1991 Masuishi et al. ...................... 371/19
5,121,501 6/1992 Baumgarter et al. .
5,124,989 6/1992 Padawa et al. ....................... 371/19
5,255,385 10/1993 Kikuchi .............................. 395/575

FOREIGN PATENT DOCUMENTS 0405845 1/1991 European Pat. Off. .
WO84/02987 8/1984 France .

OTHER PUBLICATIONS

L. D. Harward, Jr., *PL/1 Trace Program*, Sep. 1970, IBM Technical Disclosure Bulletin, vol. 13 No. 4, 855–857.

*Primary Examiner*—Robert W. Beausoliel, Jr.
*Assistant Examiner*—Albert Decady
*Attorney, Agent, or Firm*—Andrew J. Dillon; Joseph P. Abate

[57] ABSTRACT

A method and apparatus for evaluating software application performance utilizing a compiler application. An evaluation function is created which may be utilized to track and store software application execution information at each invocation thereof. A software application to be evaluated is compiled utilizing a compiler application which inserts at least one prelude routine command during compiling which is utilized to invoke the prelude routine upon each entry to a procedure within the software application. A command invoking the evaluation function is inserted into the prelude routine such that each entry to a procedure within the, software application under evaluation will result in the storage of execution information at that point. In the depicted embodiment of the present invention execution information at each exit from a procedure within the software application is also tracked and stored by invoking the evaluation function automatically prior to returning from a current procedure.

7 Claims, 5 Drawing Sheets

DISPLAY 14
10
PROCESSOR 12
16 KEYBOARD
SELECTOR OFFSET
18
SELECTOR TABLE
SEGMENT 1
SEGMENT 2
SEGMENT 3
22
SEGMENT N
MEMORY
SEGMENT 3
20
SEGMENT 1
SEGMENT N

METHOD AND APPARATUS FOR SOFTWARE APPLICATION EVALUATION UTILIZING COMPILER APPLICATIONS

BACKGROUND OF THE INVENTION

1. Technical Field

The invention relates in general to the field of software application performance evaluation and in particular to a method and apparatus for noninvasive performance evaluation of a software application. Still more particularly, the present invention relates to a method and apparatus for utilizing a compiler application to evaluate the performance of a software application having multiple procedures.

2. Description of the Related Art

Performance analysis of software applications within a data processing system is a well known technique in the prior art. Two basic techniques are generally utilized for such analysis. Firstly, a timing strategy may be utilized to analyze a software application. A system clock may be utilized to time selected events within the application by placing so-called "hooks" or trace points within the code of the application and then storing the time at which each of these "hooks" occurs.

This technique works well; however, it is necessary to be able to modify the application and/or the operating system in order to insert these software "hooks." Selected operating systems, such as the OS/2 Operating System distributed by International Business Machines Corporation of Armonk, N.Y. include a high degree of isolation between applications within the operating system and are not easily modifiable. In such an operating system the user may not be aware of the internal workings of an application within the operating system and may not be able to easily modify the code within such an application. Further, this method requires a significant programming effort in order to add these trace points or "hooks" to the program under evaluation.

The second technique for analyzing a software application involves the attachment of instrumentation hardware such as the iPAT or ICE development tools by the Intel Corporation of Santa Clara, Calif. These development tools are expensive and frequently require multiple executions of test scenarios to completely profile a program. This is due to the fact that these development tools have a limited number of address ranges which may be profiled simultaneously and many software applications have more routines than may be profiled in a single pass. Multiple passes through a software application with such a development tool will require careful control of the experiments and reconciliation of the data collected in each of the multiple passes. Additionally, such hardware systems may be utilized in conjunction with installed trace points or "hooks" to evaluate a software application but such systems require the software application to be modified as discussed above.

It should therefore be apparent that a need exists for a method and apparatus for performing an execution analysis of a selected software application within a multi-thread operating system which may be accomplished without the utilization of extensive software modifications or complex instrumentation hardware.

SUMMARY OF THE INVENTION

It is therefore one object of the present invention to provide an improved software application performance evaluation tool.

It is another object of the present invention to provide an improved method and apparatus for noninvasive performance evaluation of a software application.

It is yet another object of the present invention to provide an improved method and apparatus for evaluating the performance of a software application having multiple procedures utilizing a compiler application.

The foregoing objects are achieved as is now described. An evaluation function is created which may be utilized to track and store software application execution information at each invocation thereof. A software application to be evaluated is compiled utilizing a compiler application which inserts at least one prelude routine command during compiling which is utilized to invoke the prelude routine utilized upon each entry to a procedure within the software application. A command invoking the evaluation function is inserted into the prelude routine such that each entry to a procedure within the software application under evaluation will result in the storage of execution information at that point. In the depicted embodiment of the present invention execution information at each exit from a procedure within the software application is also tracked and stored by invoking the evaluation function automatically prior to returning from a current procedure.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
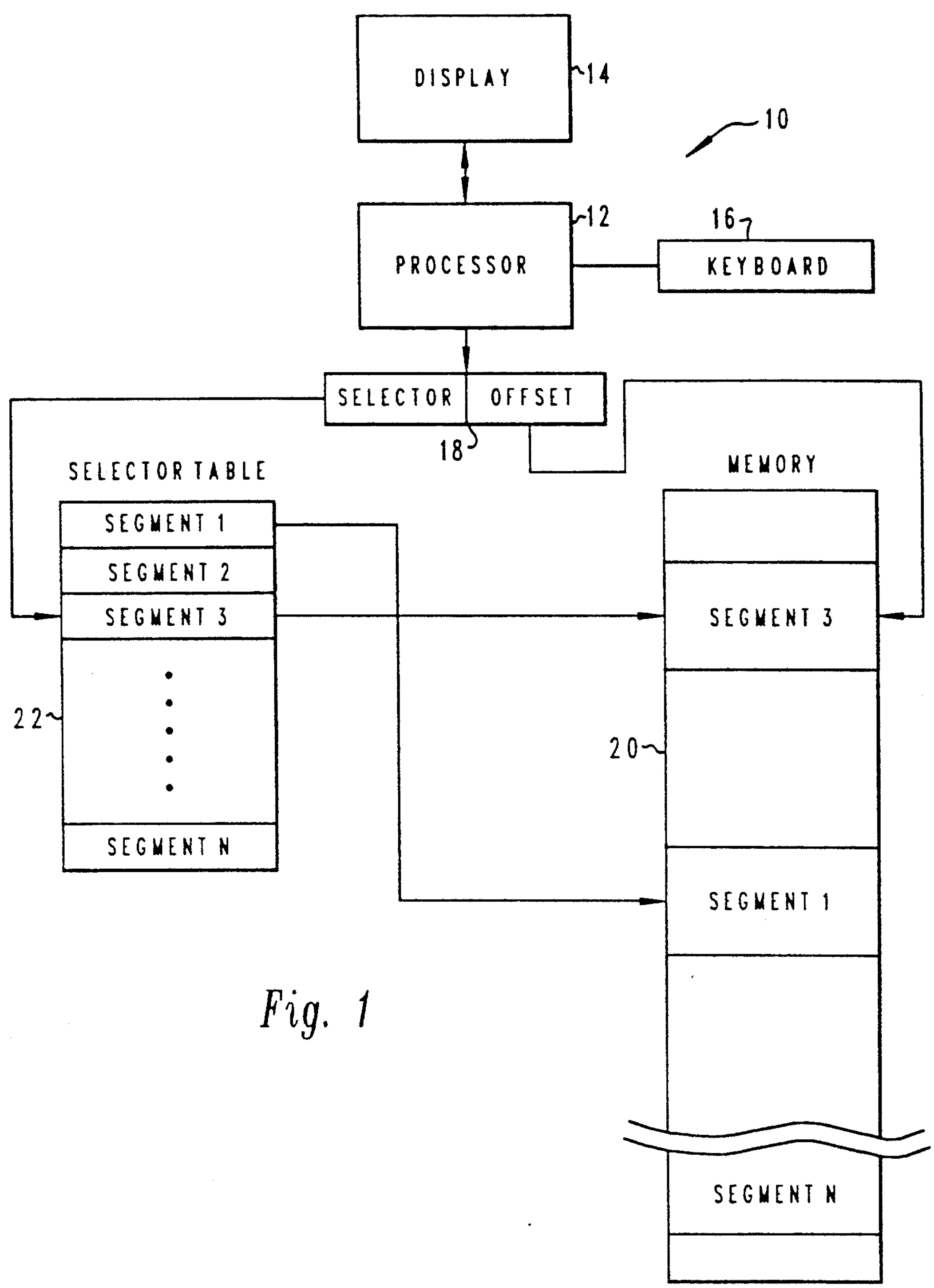
FIG. 1 is a block diagram of a data processing system which may be utilized to implement the method and apparatus of the present invention.

With reference now to the figures and in particular with reference to FIG. 1, there is depicted a block diagram of a data processing system 10 which may be utilized to implement the method and apparatus of the present invention. As is illustrated, data processing system 10 includes a processor 12 coupled to a display 14 and a keyboard 16. Those skilled in the art will appreciate that data processing system 10 may be implemented utilizing any suitable computer, such as the PS/2 Personal Computer manufactured by International Business Machines Corporation of Armonk, N.Y.

Processor 12 is utilized, in a manner well known in the art, to access data stored within memory 20 by means of memory segment selector 18. Memory segment selector 18 is utilized to access a selector table which points to a particular segment within memory 20 and also provides an offset from the base pointer within that segment so that a particular location within that memory segment may be accessed. Those skilled in the art will appreciate that memory segments need not be arranged consecutively within memory 20 and may be of various sizes. Additionally, memory segments may, under current standards, overlap to some extent.

It is precisely this segmented approach to memory illustrated within FIG. 1, which makes the evaluation of a software application under development highly desirable. Access to one portion of memory within a segment from another portion of memory within that same segment is a highly efficient method within current architectures. However, a so-called "FAR" call, that is, a memory access from one memory segment which crosses a segment border to another segment, is much more complex and requires substantially more clock cycles and processor assets due to the additional address bits which must be verified for such a memory access.

Thus, when creating a software application those skilled in the art will appreciate that an evaluation of the application during testing to ensure that the largest number of memory accesses from one procedure to a second procedure will occur within the same memory segment will ensure high application efficiency. In this manner accesses to memory which cross segment boundaries may be limited to those procedure calls which occur infrequently and, as a result, a software application may be executed in a much more efficient manner. It is therefore an object of the present invention to provide an evaluation technique whereby the sequence whereby procedures within a multiple procedure software application are stored within memory may be accomplished in a manner which results in the maximum efficiency. That is, the application contains the minimum number of memory accesses which must cross a segment boundary.

Those skilled in the art will appreciate that in other non-segmented memory architectures it is still important to evaluate what percentage of the execution time of an application is being spent in each routine within the application. By utilizing this knowledge a programmer may spend his or her time optimizing those routines or functions within an application which represent the largest majority of the execution time for an application. In this manner the efficiency of a particular application may be optimized by enhancing the efficiency of those routines representing the largest percentage of the execution time.

Figure 2:
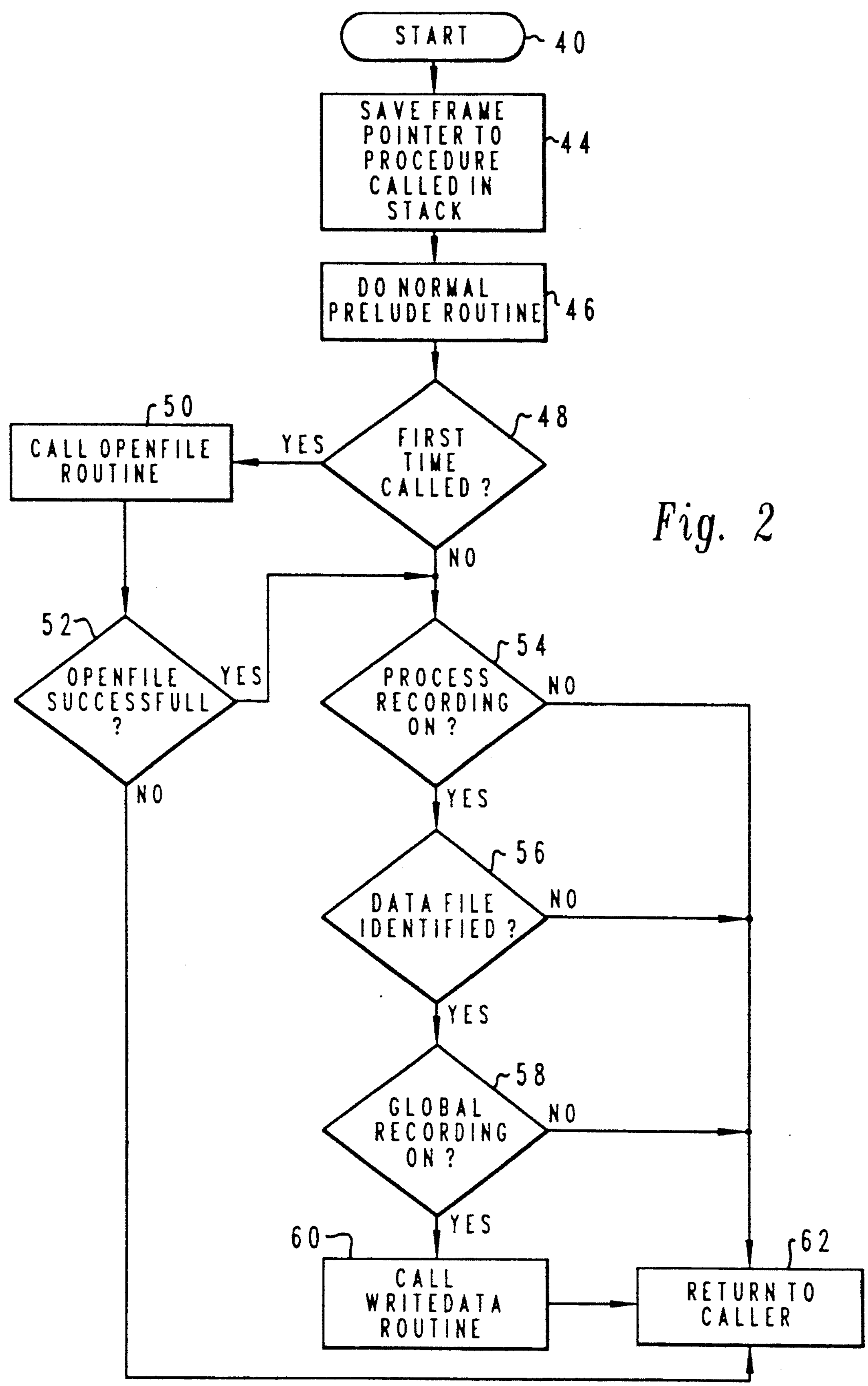
FIG. 2 is a high level flowchart illustrating the invocation of an evaluation function during a prelude routine.

Referring now to FIG. 2, there is depicted a high level flowchart which illustrates the invocation of an evaluation function during a prelude routine in accordance with the method and apparatus of the present invention. Those skilled in the art will appreciate that upon the creation of a software application in so-called "source code" the application must necessarily be compiled into an appropriate language to be executed within a processor, such as processor 12 within data processing system 10 of FIG. 1. This is generally accomplished utilizing a compiler application which translates a source software application into an executable program. Many existing compiler applications utilize a prelude or postlude routine to precede or follow the execution of a routine, procedure, or function within the application. This is particularly true in so-called "stack" oriented compilers which utilize a buffer memory queue for execution of a multiple procedure applications. In such instances it is common for the compiler application to automatically insert a call to a memory evaluation function prior to an entrance into a subroutine or procedure so that a lack of sufficient memory to operate that procedure within the processor will result in a soft failure and program termination rather than a hard failure due to lack of memory during execution.

One example of such a prelude function is utilized within the C/2 Compiler distributed by International Business Machines Corporation of Armonk, N.Y. The 13chkstk routine within the IBM C/2 Compiler is utilized at each entry to every function or routine that is generated or compiled to determine if enough space on the memory stack is present to allocate the routine's local or automatic variable data area. If sufficient room is available, then allocation of the memory stack space will occur, and if not, the program will be terminated in a so-called "soft" failure. While the present application makes utilization of this 13chkstk routine, other compiler applications which do not utilize this function may be utilized to evaluate software applications utilizing any suitable prelude or postlude routine which may be linked by the compiler with each procedure as that procedure is executed.

Referring to FIG. 2, the process depicted therein begins at block 40 and thereafter passes to block 44 which depicts the saving of the frame pointer to the procedure called within the memory stack. This occurs in order that the procedure called may be accessed after the additional processing, which is accomplished during the 13chkstk routine in accordance with the method of the present invention. Next, block 46 illustrates the processing of the normal prelude routine. That is, when utilizing the 13chkstk routine the availability of sufficient memory within the memory stack is determined.

Thereafter, the process passes to block 48. Block 48 illustrates a determination of whether or not this is the first time that the prelude routine has been called. If so, the process passes to block 50 which depicts the calling of the openfile routine. The openfile routine is a routine which is utilized to establish a data file wherein execution information may be stored during the evaluation process as illustrated within the present application. Thereafter, the process passes to block 52 which depicts a determination of whether or not the openfile routine was successful. If not, the process returns to the caller, as illustrated in block 62. If the openfile routine was successful, the process then passes to block 54 to continue in a manner which will be described in greater detail below.

Referring again to block 48, in the event the prelude routine is not called for the first time, as depicted within block 48, the process then passes to block 54. Block 54 depicts a determination of whether or not process recording has been enabled for the particular process and if not, the process passes to block 62 to return to the caller. By "process recording" what is meant is an evaluation procedure which has been enabled for a selected procedure within a software application. If process recording has been selected for the process which is being executed, as determined in block 54, then the process passes to block 56. Block 56 illustrates a determination of whether or not a data file has been identified to store the execution information which will be, generated in accordance with the method and apparatus of the present invention, and if not, the process again passes to block 62 to return to caller.

If a data file has been identified for storage of execution information, as determined in block 56, the process then passes to block 58. Block 58 illustrates a determination of whether or not the global recording function has been enabled. By "global recording" function, what is meant is execution information will be generated and stored for all procedures within the software application currently being executed. If not, the process passes to block 62 and returns to caller. In the event global recording is enabled, the process passes to block 60 which illustrates the calling of the writedata routine whereby execution information with regard to the software application will be stored within a designated file.

Figure 3:
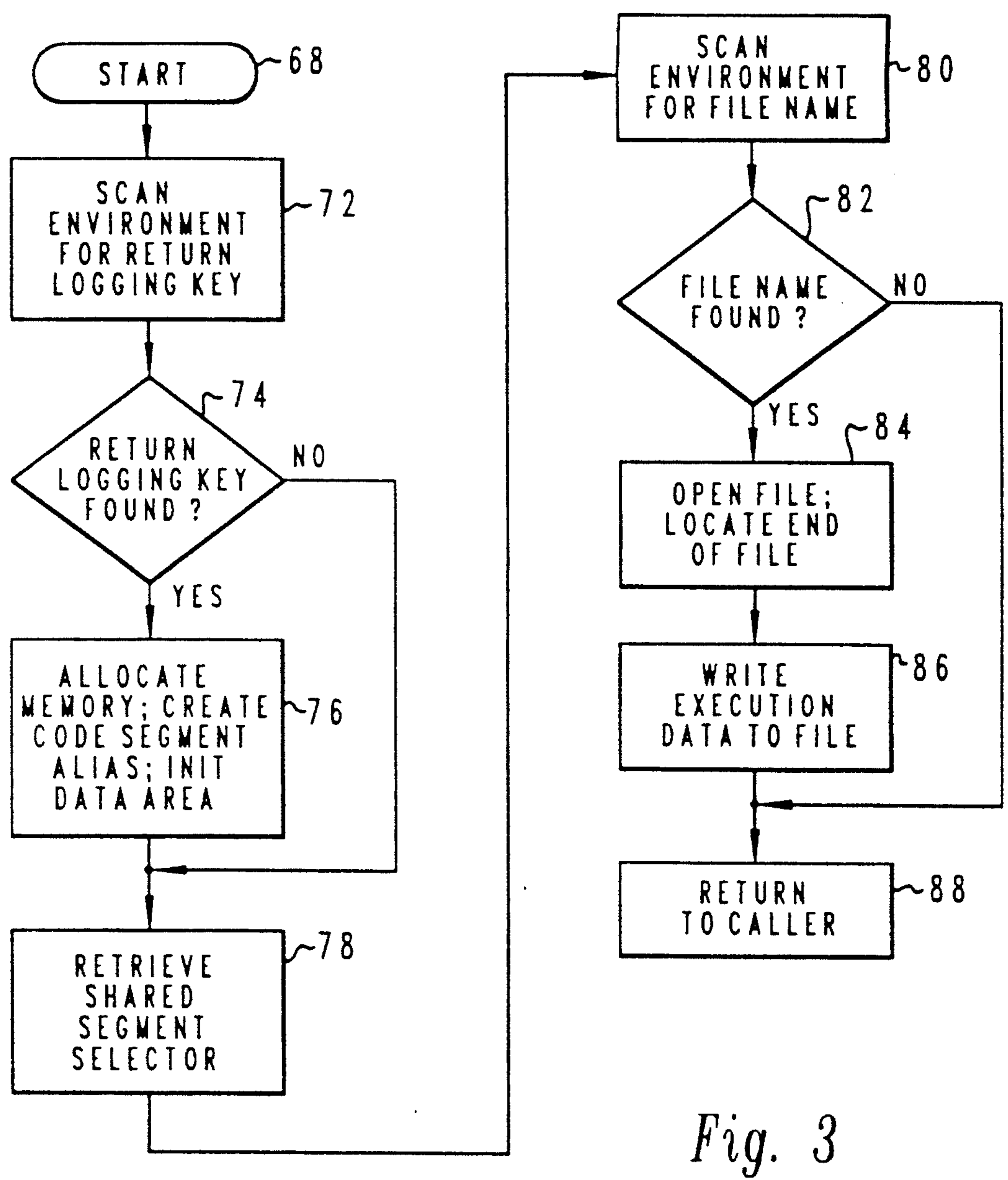
FIG. 3 is a high level flowchart illustrating the opening of an evaluation file for storing execution information.

With reference now to FIG. 3, there is depicted a high level flowchart illustrating the opening of an evaluation file for storing execution information. This is the so-called "openfile" routine illustrated within block 50 of FIG. 2. As above, this process begins at block 68 and thereafter passes to block 72 which depicts the scanning of the environment for the return logging key. In the depicted embodiment of the present invention the return logging key is utilized to indicate whether or not execution data for the software application under evaluation will be recorded upon each entry to a procedure and also upon each exit from a procedure within the software application, utilizing a method which will be explained in greater detail herein.

Next, the process passes to block 74 which depicts a determination of whether or not the return logging key has been found. If so, the process passes to block 76 which illustrates the allocation of memory, the creation of a code segment alias, which is a selector pointing to a code segment. Additionally, a data area is initialized. The data area, in the depicted embodiment of the present invention, will include a call instruction to access a procedure whereby execution data may be stored during a return from a procedure, the entry point which the process will be returning from and the actual user return point.

Next, or in the event the return logging key is not found, the process passes to block 78. Block 78 illustrates the retrieval of the shared segment selector. The shared segment selector, in the depicted embodiment of the present invention, is utilized to indicate whether or not global recording is enabled for a particular evaluation being conducted. Thereafter, the process passes to block 80, which illustrates the scanning of the environment for the file name to which the execution data will be written.

As illustrated within block 82, in the event the file name is not found, the process passes to block 88 and returns to the caller. However, in the event a file name to which the execution data will be written is found, the process passes to block 84. Block 84 illustrates the opening of the file and the location of the end of the data written into that file. Thereafter, block 86 illustrates the writing of execution data into that file and the process then passes to block 88 and returns to the caller.

Figure 4:
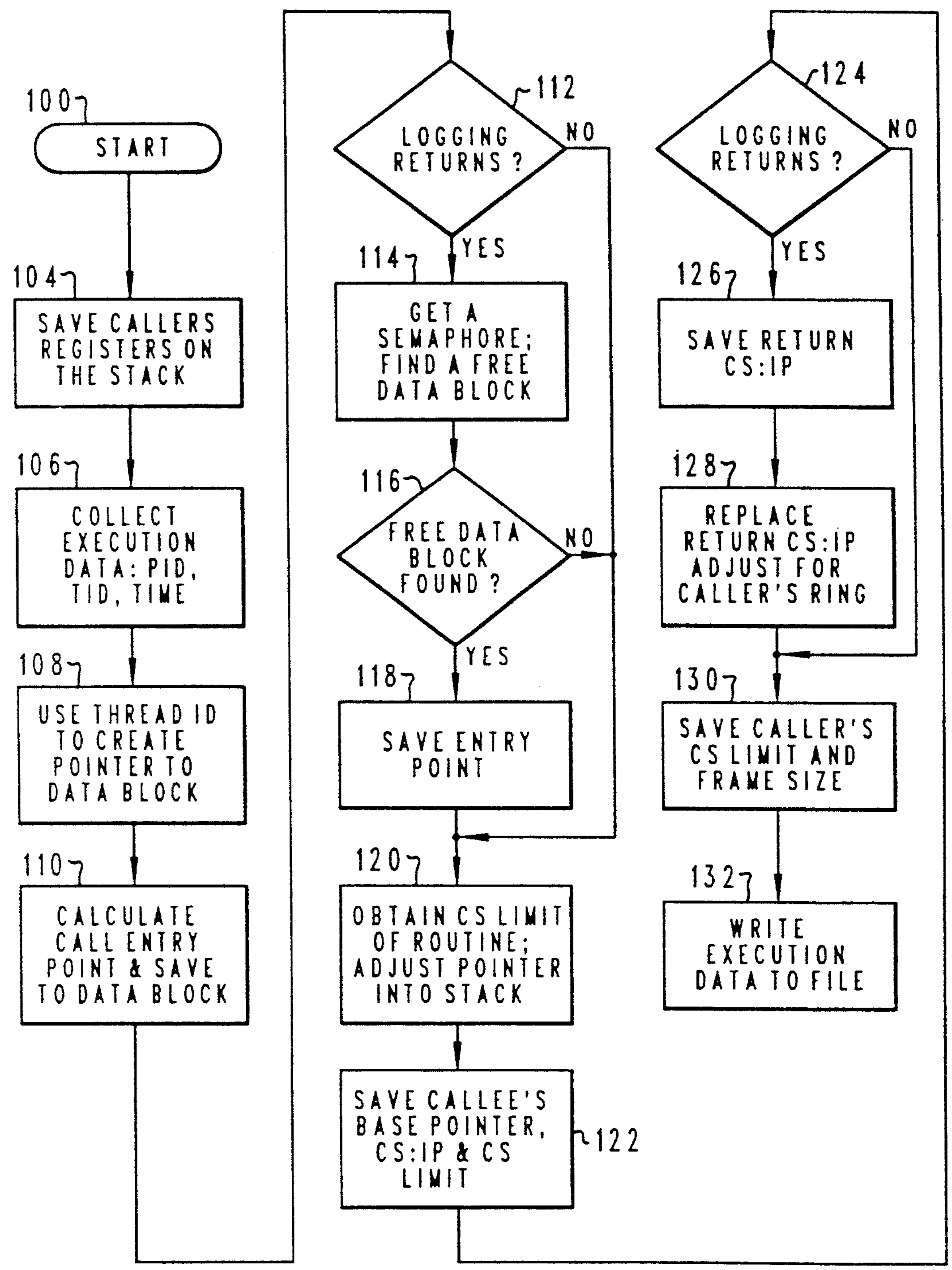
FIG. 4 is a high level flowchart illustrating the writing of execution information upon an entry to a procedure within a software application under evaluation.

Referring now to FIG. 4, there is depicted a high level flowchart illustrating the writing of execution information upon an entry to a procedure within a software application under evaluation. This procedure is referred to as the "writedata" routine within block 60 of FIG. 2. As above, this process begins at block 100 and thereafter passes to block 104 which depicts the saving of the caller's registers present on the stack which has been established to execute the procedure in question. Next, the process passes to block 106 which illustrates the collecting of execution data. That is, a process identification (PID), a thread identification (TID) and the time of execution. Thereafter, the process passes to block 108 which depicts the utilization of the thread identification to create a pointer to a data block. This technique is utilized since data blocks are assigned per thread within the process memory segment. Next, the process passes to block 110. Block 110 illustrates the calculation of the call entry point and the saving of that call entry point to the data block.

The process now passes to block 112, which illustrates a determination of whether or not execution data is being logged for each exit from a procedure. That is, a return from a procedure which has been called. If so, the process passes to block 114 which illustrates the obtaining of a semaphore and the finding of a free data block. The semaphore is utilized to prevent two threads from calling the same block of data. Block 116 then illustrates a determination of whether or not a free data block has been found and thereafter, in the event a free data block has been found, the process passes to block 118, which illustrates the saving of the entry point.

Next, in the event returns from procedures are not to be logged, a free data block has not been found, or the entry point has been successfully saved, the process passes to block 120. Block 120 illustrates the obtaining of the code segment limit for the routine and the adjustment of the pointer into the stack for the base pointer and data segment. The process then passes to block 122 which depicts the saving of the called routine's base pointer, code segment instruction pointer (CS:IP) and code segment limit. The process then passes to block 124.

Block 124 illustrates a second determination of whether or execution data is being logged upon the return from a procedure, and if so, the process passes to block 126. Block 126 illustrates the saving of the return code segment instruction pointer (CS:IP). Those skilled in the art will appreciate that a return code segment instruction pointer is entered into a memory stack to designate the location to which the called procedure should return within the calling procedure upon the completion of the called procedure. In order to log execution data upon the completion of each procedure this instruction pointer is removed and, as illustrated in block 128, replaced with a substitute return instruction pointer, which will invoke an evaluation function which will determine and store execution data at the point of return from a procedure. The replacement instruction pointer must also be adjusted for the caller's ring, as those skilled in the art will appreciate.

Thereafter, or in the event execution data is not logged upon the return from a procedure, as determined within block 124, the process passes to block 130. Block 130 illustrates the saving of the calling procedure's code segment limit and frame size. Thereafter, the execution data is written to the established file, as determined in block 132. Those skilled in the art will appreciate that by storing code segment limits and frame sizes the memory segment sizes necessary to relocate procedures within the application may be readily determined, in the event it is desired to locate two procedures within the same memory segment to minimize the number of memory accesses which must occur across a memory segment border.

Figure 5:
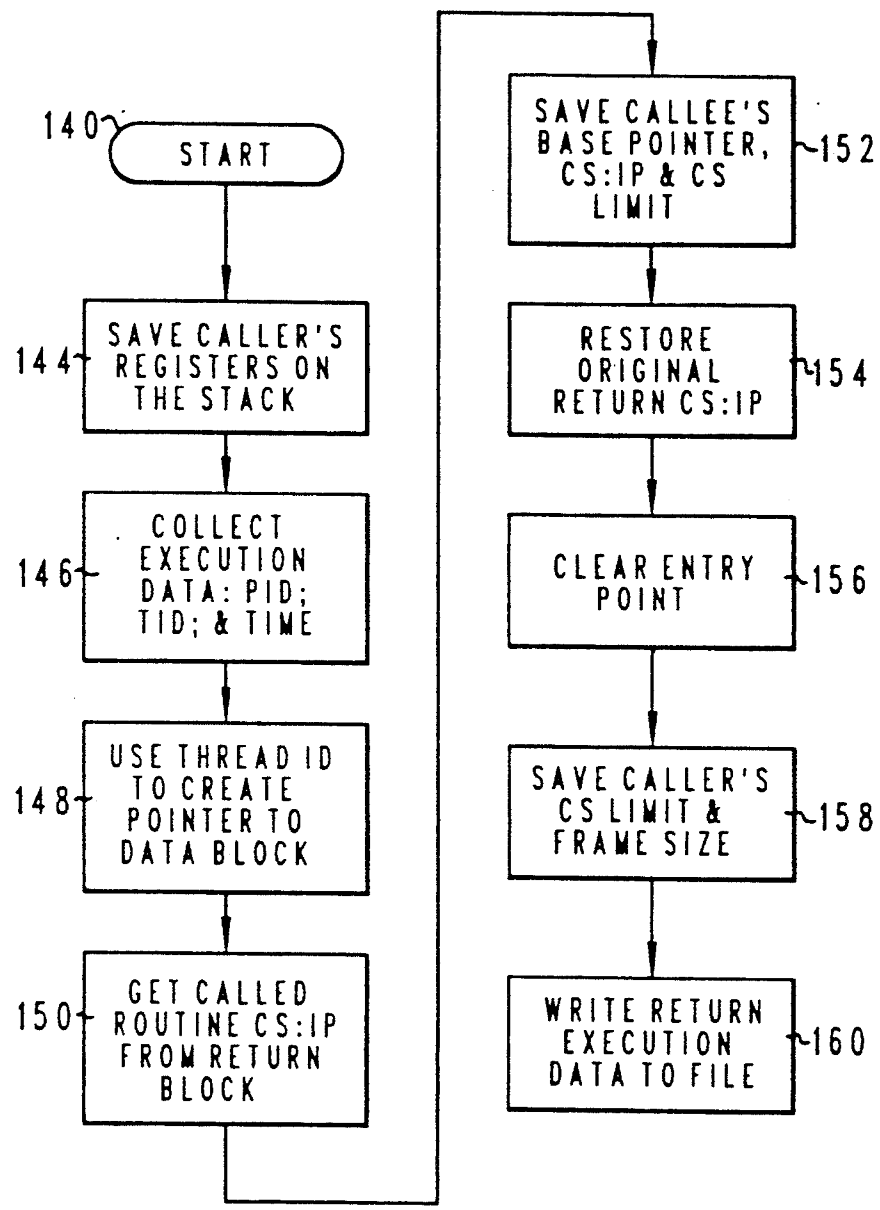
FIG. 5 is a high level flowchart illustrating the writing of execution information upon an exit from a procedure within a software application under evaluation.

Finally, with reference to FIG. 5, there is depicted a high level flowchart illustrating the writing of execution information upon a return from a procedure within a software application under evaluation. Those skilled in the art will appreciate that this procedure is invoked, in the event execution data is desired upon each return from a procedure, by replacing the return instruction pointer within a stack which points to the return address within the calling procedure with a substitute instruction pointer which will invoke this routine.

As above, this procedure begins at block 140 and thereafter passes to block 144. Block 144 illustrates the saving of the caller's registers on the stack.

Next, the process passes to block 146. As above, with respect to execution data which was stored upon the entry to a procedure, block 146 illustrates the collection of execution data including the process identification (PID), the thread identification (TID) and the time of execution. Similarly, block 148 illustrates the utilization of the thread identification to create a pointer to a data block, such that the data block may be assigned to a particular thread. Next, block 150 illustrates the obtaining of the called routine's code segment instruction pointer (CS:IP) from the return block.

Next, block 152 illustrates the saving of the called routine's base pointer, code segment instruction pointer (CS:IP) and code segment limit. The process then passes to block 154 which depicts the restoration of the original return code segment instruction pointer (CS:IP), such that the process may return to the original calling process after the execution data has been obtained and stored. Block 156 then illustrates the clearing of the entry point and the calling routine's code segment limit and frame size are stored, as depicted within block 158. Finally, block 160 illustrates the writing of the return execution data to the file for subsequent processing.

Upon reference to the foregoing those skilled in the art will appreciate that the Applicants in the present application have created a method and apparatus whereby software applications having multiple procedures may be efficiently and automatically evaluated utilizing a compiler application. Upon each invocation of a prelude or postlude routine which is invoked as a result of a command inserted by the compiler an evaluation function may be selectively invoked. The evaluation function then automatically obtains and stores execution data regarding the state of the application at that point and the execution data is written to an evaluation file for subsequent processing. Analysis of this data may be utilized to determine the most efficient manner of allocating each procedure within memory segments in order to maximize the rapidity of processing for a particular software application and may also be utilized to alter the relative sizes of memory segments to accommodate such a reorganization.

While the invention has been particularly shown and described with reference to a preferred embodiment, it will be understood by those skilled in the art that various changes in form and detail may be made therein without departing from the spirit and scope of the invention.

We claim:

1. A method in a data processing system for evaluating the performance of a selected software application having multiple procedures, said method comprising the steps of:

creating an evaluation function within said data processing system for recording status indications of a software application in response to each invocation of said evaluation function;

providing a compiler application for translating said selected software application into an executable program, said compiler application automatically inserting into said executable program a verification command for invoking a memory availability test function in response to each entry to one of said multiple procedures;

inserting into said memory availability test function an evaluation command for invoking said evaluation function; and during execution of said executable program invoking said evaluation function in response to each evaluation command.

2. The method in a data processing system for evaluating the performance of a selected software application having multiple procedures according to claim 1, wherein said compiler application is a stack oriented compiler application and wherein a return point is entered into a stack in response to an entry to one of said multiple procedures.

3. The method in a data processing system for evaluating the performance of a selected software application having multiple procedures according to claim 2, further including the step of invoking said evaluation function in response to each exit from one of said multiple procedures.

4. The method in a data processing system for evaluating the performance of a selected software application having multiple procedures according to claim 3, wherein said step of invoking said evaluation function in response to each exit from one of said multiple procedures comprises the step of invoking said evaluation function in response to an attempted access of said return point.

5. A data processing system for evaluating the performance of a selected software application having multiple procedures, said data processing system comprising;

an evaluation function within said data processing system for recording status indications of a software application in response to each invocation of said evaluation function;

a compiler application for translating a source software application into an executable program;

means for inserting into said executable program during compiling of said selected software application a verification command for invoking a memory availability test function in response to each entry to one of said multiple procedures;

a memory availability test function having an evaluation command contained therein, said evaluation command for invoking said evaluation function; and means for invoking said evaluation function during execution of said executable program compiled from said selected software application in response to said evaluation command.

6. The data processing system for evaluating the performance of a selected software application having multiple procedures according to claim 5, further including means for invoking said evaluation function in response to each exit from one of said multiple procedures.

7. The data processing system for evaluating the performance of a selected software application having multiple procedures according to claim 5, wherein said evaluation function includes a clock and wherein said status indications include at least an indication of present time.

* * * * *